United States Patent
Fan et al.

(10) Patent No.: US 8,559,608 B2
(45) Date of Patent: Oct. 15, 2013

(54) LOCATION INFORMATION PROVISIONING

(75) Inventors: James Fan, San Ramon, CA (US);
Thomas Barrett, San Ramon, CA (US);
Jennifer Lam, Fremont, CA (US); Hieu Le, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 60 days.

(21) Appl. No.: 13/112,494

(22) Filed: May 20, 2011

(65) Prior Publication Data
US 2012/0294434 A1    Nov. 22, 2012

(51) Int. Cl.
*H04M 1/56*    (2006.01)
*H04M 15/06*   (2006.01)

(52) U.S. Cl.
USPC ............... 379/142.1; 379/142.17; 455/415; 455/456.2; 455/457

(58) Field of Classification Search
USPC ............... 379/142.04, 142.06, 142.1, 142.14, 379/142.17; 455/415, 456.1, 456.2, 457
See application file for complete search history.

(56) References Cited

U.S. PATENT DOCUMENTS

| 7,805,147 | B1* | 9/2010 | Rosen et al. | 455/456.1 |
|---|---|---|---|---|
| 8,036,356 | B1* | 10/2011 | Ghosh et al. | 379/142.1 |
| 2003/0119522 | A1* | 6/2003 | Barclay et al. | 455/456 |
| 2004/0257274 | A1* | 12/2004 | Benco et al. | 342/357.1 |
| 2005/0043042 | A1* | 2/2005 | Hwang et al. | 455/456.2 |
| 2008/0112551 | A1* | 5/2008 | Forbes et al. | 379/142.1 |
| 2008/0194260 | A1 | 8/2008 | Altberg et al. | |
| 2009/0110166 | A1* | 4/2009 | Urban et al. | 379/142.1 |
| 2010/0098237 | A1 | 4/2010 | Contractor | |
| 2010/0304707 | A1* | 12/2010 | Bolin | 455/404.2 |
| 2011/0255677 | A1* | 10/2011 | Kasad | 379/142.1 |

* cited by examiner

*Primary Examiner* — Binh Tieu
(74) *Attorney, Agent, or Firm* — Hartman & Citrin LLC

(57) ABSTRACT

A location of a calling party is provided to a called party. The location can be provided if the calling party is using a mobile communications device or a wireline system. The location of the calling party can be provided in a hierarchy of various levels of accuracy/precision representative of different geographies provided by a service provider. The choice of levels for each received call or all received calls can be configurable by the called party. The called party may subscribe to a service that provides the location information. The called party may have the option to receive location information on a per call basis. The calling party may be asked for consent. Location information can be provided for any appropriate type of call, such as, for example, voice calls, text based calls (e.g., SMS messages), or the like. In an example configuration, the SS7 network is utilized.

20 Claims, 12 Drawing Sheets

| Location ID level | Location ID Mapped to: | Location ID Sample |
|---|---|---|
| Level 1 (Default) | Continent, Country, State, Metropolitan | North_America.USA.CA |
| Level 2 | Area of multiple counties or Single County | CA.Bay_Area or CA.Bay_Area.Santa_Clara |
| Level 3 | Multiple Cities or Towns or a single City/Town | CA.Bay_Area.Santa_Clara.Mountain_View |
| Level 4 | Street or Intersections | CA.Bay_Area.Santa_Clara.Mountain_View.Street one_Street_two |
| Level 5 | Living Unit Address | 2600 Camino Ramon, Room 100, San Ramon, CA 94583 |

FIGURE 2

LOCATION INFORMATION PROVISIONING

TECHNICAL FIELD

The technical field generally relates to telecommunications, and more specifically relates to providing an indication of a location of a calling party to a called party.

BACKGROUND

It is not uncommon for a person to be ordered to adhere to a constraining order in which the person must stay a specific distance away from another person. Or, one can envision a scenario involving domestic violence, in which a person does not want to be in proximity of another person in order to avoid a conflict. With the widespread use of portable communications devices, however, such as cellular phones and local number portability features available in wireline systems (e.g., landline systems), a called party can no longer be sure about the location of a calling party.

SUMMARY

A location of a calling party is provided to a called party. The location can be provided if the calling party is using a mobile communications device, such as a cellular phone, or a wireline system. The location of the calling party is based on a location of the communications device that the calling party is using, and not necessarily a geographic region associated with an area code and/or exchange of the phone number for the communications device the calling party is using. In an example configuration, the location of the calling party can be provided in a hierarchy of various levels of accuracy/precision. Different levels can be representative of different resolutions of geography. For example, a first level could be representative of a broad geographic resolution, such as a region (e.g., country, state, continent, etc.), a second level could be representative of a finer geographic resolution, such as a county, township, etc., a third level could be representative of an even finer geographic resolution, such as a city, building (e.g., apartment building, etc.), complex (e.g., shopping mall, college campus, corrections facility, a park, etc.), a fourth level could be representative of a building in a complex (building on a college campus, store in a shopping mall, etc.), a floor or a wing in a building, and a fifth level could be representative of a location as precise and accurate as allowed by the technology being used to determine the location (e.g., latitude and longitude, street corner intersection, etc.). Thus, each level can represent a finer geographic resolution. The level or levels can be configurable and selectable by the called party. The called party may subscribe to a service that provides location information. The called party may have the option to receive location information on a per call basis. The calling party may be asked for consent. In an example embodiment, if consent is not given, a default level of location information can be provided. Location information can be provided for any appropriate type of call, such as, for example, voice calls, text based calls (e.g., SMS messages), or the like.

An example system for facilitating providing location information includes a signaling system number 7 (SS7) network, an address/location handler that handles requests for location information, a living unit address database that comprises information pertaining to the various levels of location information, and a location coordinates mapping database that supports mapping of geographic coordinates to any of the levels of the location information.

BRIEF DESCRIPTION OF THE DRAWINGS

FIG. 2 is a table depicting an example hierarchy of levels of location information.

DETAILED DESCRIPTION OF ILLUSTRATIVE EMBODIMENTS

Figure 1:
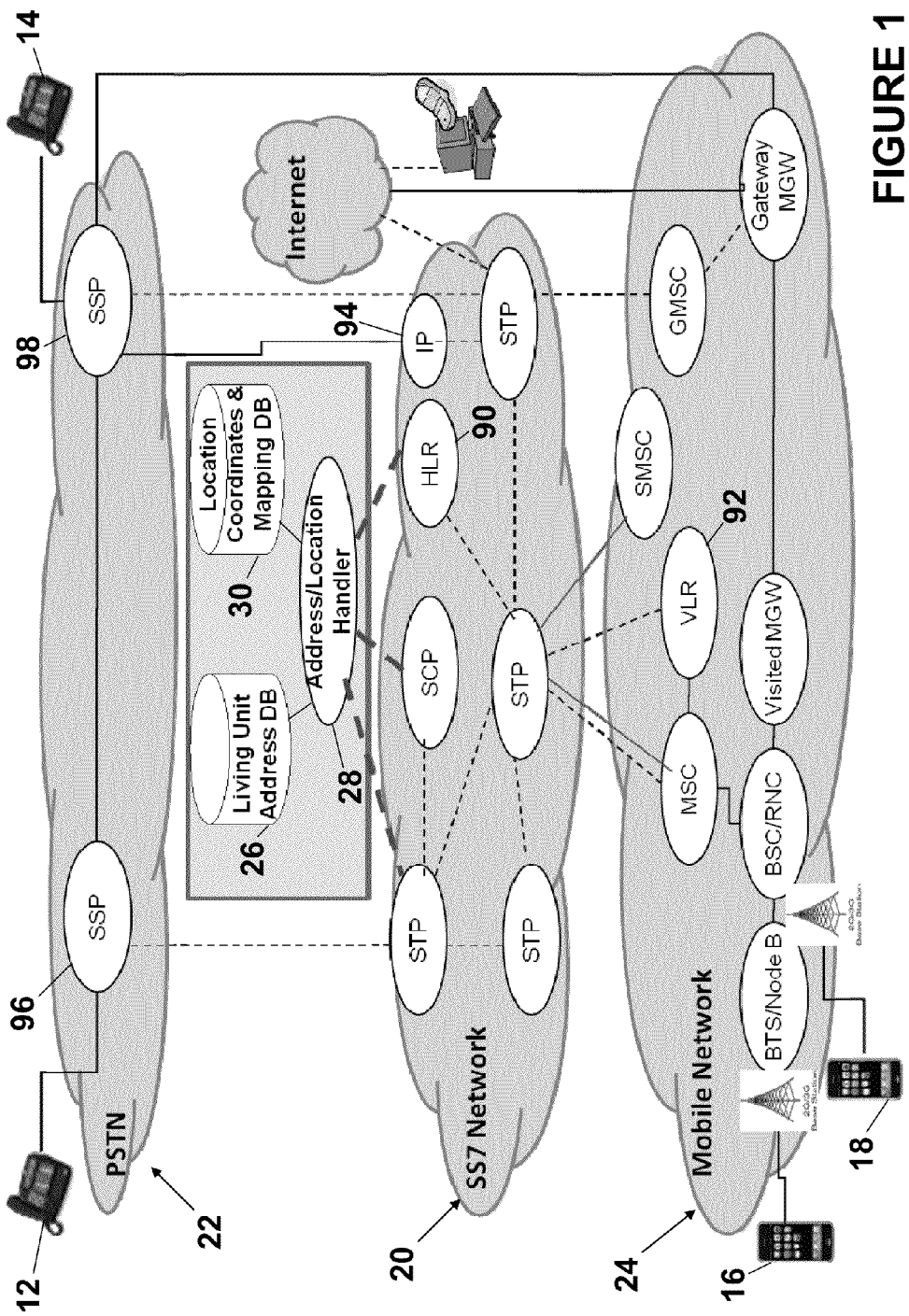
FIG. 1 is a diagram of an example system for providing location information.

FIG. 1 is a diagram of an example system for providing location information. As depicted in FIG. 1, when a call is originated from a communications device, such as communications device 12, 14, 16, or 18, for example, the signaling system number 7 (SS7) network facilitates the call set up process. The caller ID and name of the calling party will be delivered to the called party (e.g., via communication device 12, 14, 16, or 18) via the signaling process. The terminating end (called party) can either have the customer name, business name, or the cellular name (e.g., wireless call) associated with the calling number. And, as described herein, the called party can receive an indication of the location of the calling party, which may not necessarily be same as the location associated with the area code and exchange of the number of the calling party. Subsequently, the called party's phone (e.g., communication device 12, 14, 16, or 18) will be rung and once the phone is picked up, the conversation will be carried through a bearer channel. Based on the caller ID and location information, the called party can know who is calling and where the call originated.

The provisioning of location information is applicable to a wide variety of system configurations. For example the provisioning of location information is applicable to calls originated from a handset/wireless communications device and terminated to a public switched telephone network (PSTN), calls originated from a telephone in the PSTN and terminated on a handset/wireless communications device, calls originated in the PSTN and terminated in the PSTN, calls originated from a handset/wireless communications device and terminated on a handset/wireless communications device, calls originated via voice over Internet protocol (VoIP) technology, and terminated on a VoIP phone, or the like. Further, the herein described location identification features can be applied to other services, such as, for example, the short message service (SMS). When a SMS message is received, the message recipient can demand the delivery of the sender's location identification.

The example system depicted in FIG. 1, comprises a signaling system number 7 (SS7) network 20, a PSTN 22, and a mobile network 24. It is to be understood that the depicted networks are exemplary, and that any appropriate networks could be utilized. For example, as explained in more detail herein, the mobile network 24 can comprise any of a variety of mobile networks. In order to provide location information as described herein, the example system depicted in FIG. 1 also comprises a living unit address database 26, an address/location handler 28, and a location coordinates and mapping database 30. The living unit address database 26, address/location handler 28, and location coordinates and mapping database 30 can be implemented in any appropriate manner via any appropriate mechanism. For example, the living unit address database 26, address/location handler 28, and location coordinates and mapping database 30 can be implemented via any appropriate processor, server, database, or any combination thereof.

The PSTN 22 depicted in FIG. 1 is indicative of any appropriate PSTN. As such, PSTN 22 comprises circuit-switched telephone networks. PSTN 22 can comprise telephone lines, fiber optic cables, microwave transmission links, cellular networks, communications satellites, undersea telephone cable, or the like, for example. The service switching points (SSPs) depicted in FIG. 1 are indicative of any appropriate SSP. An SSP is a telephone exchange or switch that initially responds when a number is dialed. SSPs can work with a service control points (SCPs) and signal transfer points (STPs) to handle calls.

An STP routes messages between various entities in the SS7 network, such as signaling end points, SCPs, and other STPs. STPs also can route messages to entities in other networks. For example, as depicted in FIG. 1, STPS can route messages to and from the mobile network 24 and to and from the PSTN 22. SCPs help control service. SCPs can be used to provide or query other entities (e.g., SDPs) in a network to obtain numbers to which calls are being routed. An SCP also can interface with an intelligent peripheral (IP) to play voice messages or prompt a user for information.

In an example embodiment, the address/location handler 28 handles requests for location information. That is, the address/location handler 28 can coordinate requests for location information by, receiving requests, obtaining information as needed via the living unit address database 26 and/or the location coordinates and mapping database 30, and providing responses to requesters. Further, the address/location handler 28 can receive information pertaining to location information (e.g., updates). As depicted in FIG. 1, the address/location handler 28 can accept requests for location information (location ID requests) from external sources such as an STP, an SCP, and/or a home location register (HLR). An HLR contains information about each subscriber authorized to use a network. For example, an HLR can contain information about each subscriber identity module (SIM) card issue by an operator of a network. The address/location handler 28 also can support non-SS7 interfaces for other location mapping needs (e.g., session initiation protocol, SIP, interface, HTTP interface, etc.). For example, a coffee shop could use the location information from a calling party to determine what type of coffee to make for the calling party and to determine when to make the coffee so that the coffee is the correct temperature when the calling party arrives.

In an example embodiment, the living unit database 26 comprises information pertaining to the various levels of accuracy/precision of the location information. And, the location coordinates mapping database 30 can support mapping of geographic coordinates to any of the levels of location identification and/or mapping of the levels of location identification to geographic coordinates. The location coordinates mapping database 30 can be updated with information via any appropriate manner.

In an example configuration, the living unit address database 26 contains at least a table with phone number-to-address mapping for each of the location levels (e.g., as depicted in FIG. 2). The location coordinates and mapping database 30 contains at least a table with geolocation code-to-real address mapping for each of the location levels (e.g., as depicted in FIG. 2). The address/location handler 28 acts as a gateway to receive location requests, phone numbers (e.g., area code and/or exchange numbers), etc. When a location is queried for, the party number along with the geolocation coordinates (for a party utilizing a mobile communications device, such as a cell phone, lap top, etc.) are provided. For a wireless call, the geolocation codes can be sent to location coordinates and mapping database 30, which can provide mapped location information back to the requestor. The location information may not contain a specific living unit address but rather, an indication of a geographic location, such as, for example, 50 feet from N Street and 100 feet from Irving Street in San Francisco. For a landline phone, the party number will be routed to living unit address database 26, which will map the party number to an exact address such as 101 Cavendish Drive, Cary, N.C.

In an example configuration, the location of the calling party can be provided in a hierarchy of various levels of accuracy/precision, wherein different levels can be representative of different geographic resolutions. And, the living unit address database 26 can comprise information pertaining to the various levels of geographic resolutions of the location information.

FIG. 2 is a table depicting an example hierarchy of levels of location information that could be stored in living unit address database 26. For example, as depicted in FIG. 2, location information can be provided in five (5) levels, each level having a different geographic resolution (granularity of accuracy and/or precision). As depicted in FIG. 2, the first level, which can be a default level, can be indicative of a continent, country, state, or metropolis. As depicted in FIG. 2, an example continent is North America, an example country is the United States of America (USA), and an example state is California (CA).

Further as depicted in FIG. 2, a second level can be indicative of multiple counties or a single county, such as the California bay area and/or Santa Clara in the California bay area. A third level can be indicative of multiple cities, multiple towns, a single city, and/or a single town. An example includes Mountain View in Santa Clara in the bay area of California. A fourth level could be indicative of street or an intersection, such as, for example, the intersection of street two and street one of Mountain View in Santa Clara in the bay area of California. And, a fifth level could be indicative of a living unit address such as 2600 Camino Ramon, Room 100, San Ramon, Calif. 94583. It is to be understood that the levels depicted in FIG. 2 are examples, and not to be construed as limiting. Thus, more or less levels could be established. The geographic resolution of levels may vary from the depiction in FIG. 2. Any level may function as a default level.

A party may select one of the levels of the plurality of levels depicted in FIG. 2. A party could select a range of levels (e.g., level 2 or higher). A party can subscribe to a service that provides the various levels depicted in FIG. 2. For example, a calling party point could block the delivery of his/her location information. If the calling party decides to block the entire location hierarchy (including the default), the service provider could optionally translate area code to a state (or other associated geographic region) and provide an indication of the state to the called party. And, in an example embodiment, the indication of the state would include an indication that the location may not be accurate. The calling party could request a consent feature such that when a called party requests a higher level of location information, the calling party will receive a real time message asking to approve or disapprove the request. A called party can subscribe to different level of location information by paying different level of subscription fees. A called party could raise the level of location information on an on-demand basis by, for example, by paying a nominal charge.

Figure 3:
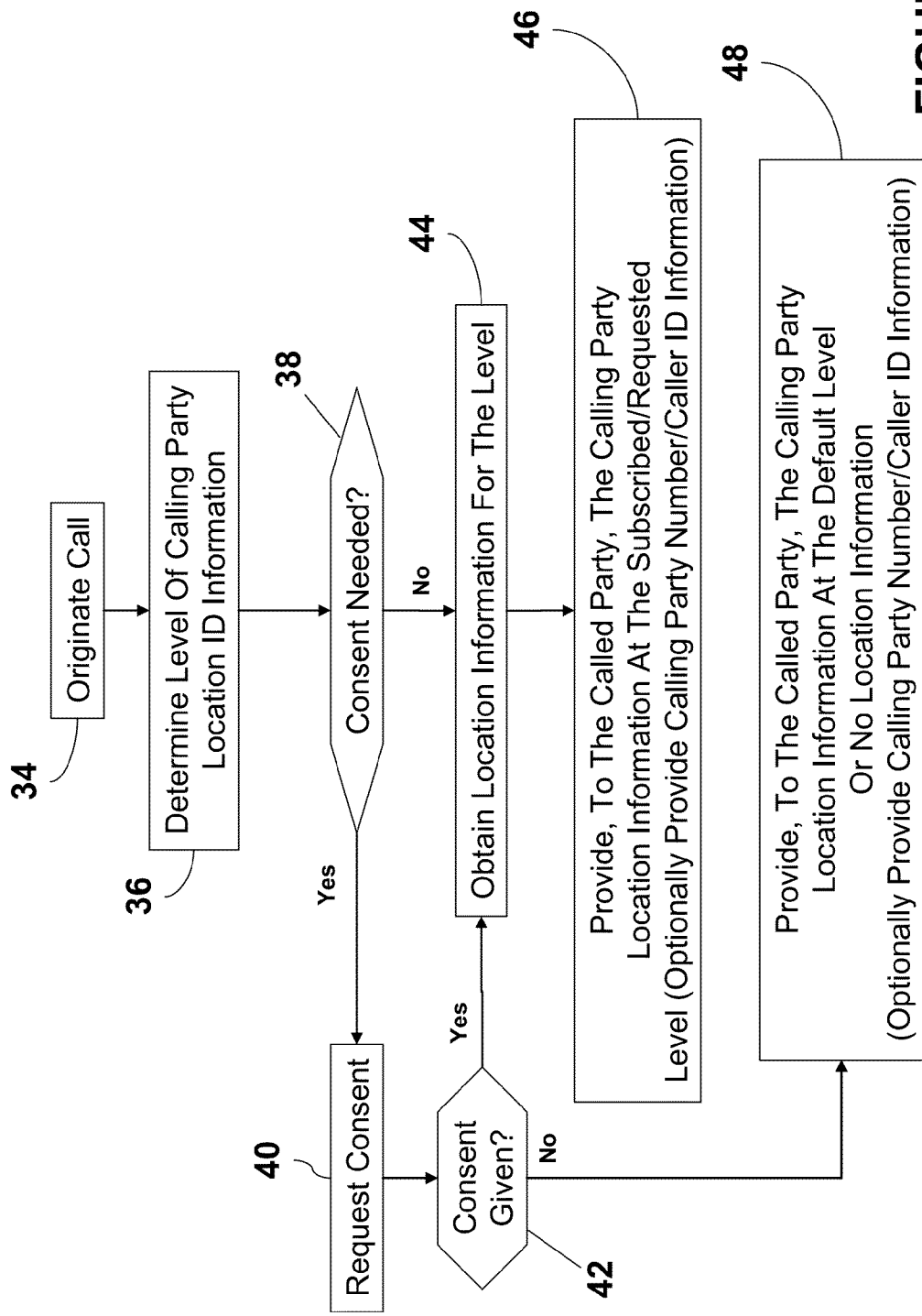
FIG. 3 is a flow diagram of an example process for providing location information to a called party.

FIG. 3 is a flow diagram of an example process for providing location information. A call is originated at step 34. At step 36, the level of location information to be provided to the called party is determined. This may be determined, for example, from the called party's subscription information, subscriber profile, on a per call basis, on an on-demand basis (e.g., requested by the called party upon an indication of an incoming call), or the like. At step 38, it is determined if consent from the calling party is needed in order to provide the called party the location information of the calling party at the appropriate (e.g., subscribed, requested, etc.) level. The determination as to whether consent is needed can be accomplished, for example, from the user/subscriber profile of the calling party. Or, if no information is available about whether consent is needed from the calling party, in an example configuration, the default can be to request consent from the calling party. If no consent is needed (step 38), location information at the subscribed-for level is obtained at step 44. Location information can be obtained via any appropriate mechanism. For example, location information can be obtained, as described in more detail below, via a default location from a call originating from a landline, the Global Positioning System (GPS), assisted GPS (A-GPS), time difference of arrival calculations, configured constant location (in the case of non-moving devices), or any appropriate combination thereof. Location information, at the subscribed-for level and/or requested level, is provided to the called party at step 46. Optionally, at step 46, the number of the calling party can be provided to the called party.

If, at step 38, it is determined that consent is needed, consent is requested at step 40. If consent is given, at step 42, location information at the subscribed-for/requested level is obtained at step 44. And, the location information, at the subscribed-for level, is provided to the called party at step 46. Optionally, at step 46, the number and/or caller ID information (e.g., name) of the calling party can be provided to the called party.

If, at step 42, consent is not given, the calling party can be provided, at step 48, no location information. Or, the calling party can be provided default location information (e.g., the lowest level as depicted in FIG. 2). In an example embodiment, if consent is not given, the area code and/or exchange number can be translated to a state and/or locality, and the state/locality can be provided along with a warning that the location information may not be accurate (e.g., because it was derived from the phone number). Optionally, at step 48, the number and/or caller ID information (e.g., name) of the calling party can be provided to the called party.

Figure 4:
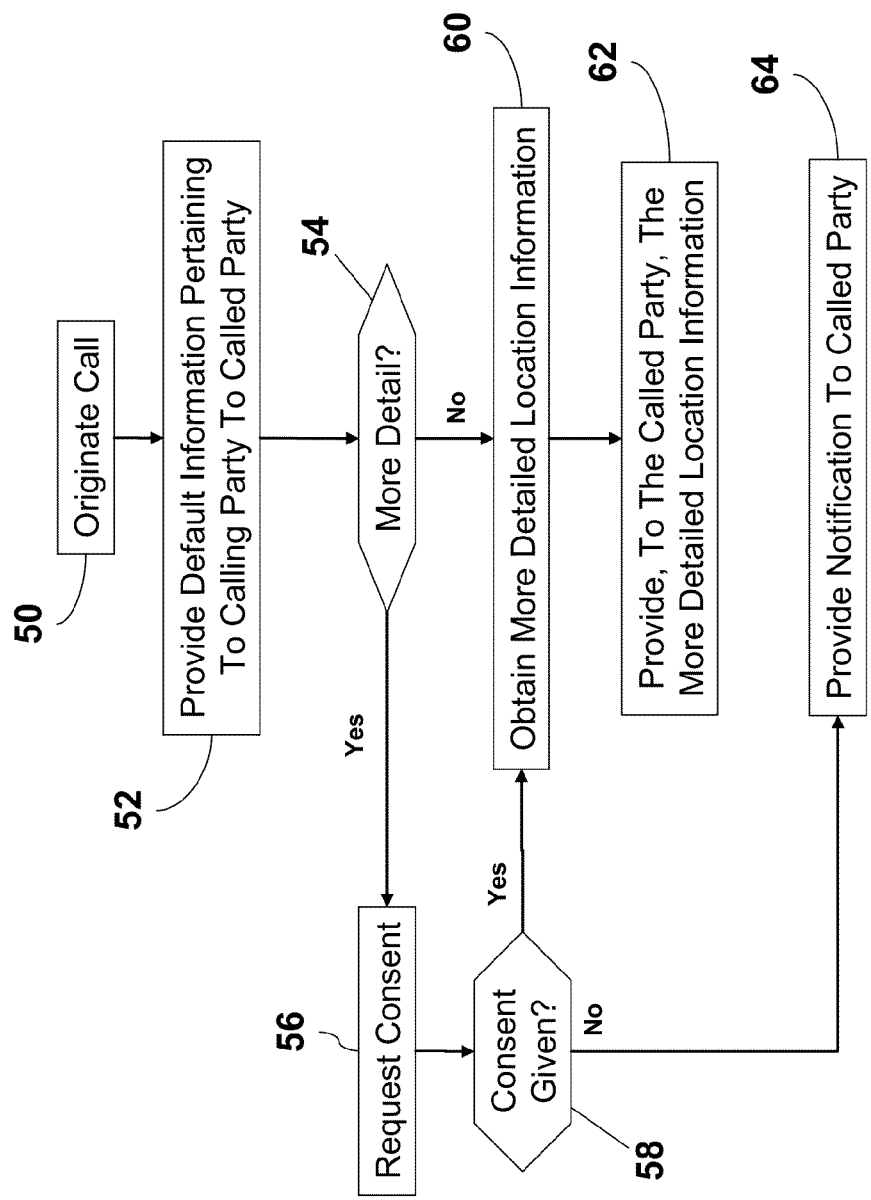
FIG. 4 is a flow diagram of another example process for providing location information to a called party.

FIG. 4 is a flow diagram of another example process for providing location information to a called party. In the example process depicted in FIG. 4, default information is provided to the called party and if the called party wants more detailed information (e.g., a higher level, e.g., finer geographic resolution, of location information), the called party requests more detail and consent of the calling party is sought. Accordingly, a call is originated at step 50. Default information pertaining to the calling party is provided to the called party at step 52. The default information can include any appropriate information, such as, for example, the number of the calling party, the name of the calling party, a default location (e.g., lowest level depicted in FIG. 2) of the calling party, or any appropriate combination thereof. At step 54, the called party decides if more detailed information is wanted. If more detailed information is wanted (step 54), consent of the calling party is requested/sought at step 56.

At step 58, it is determined if consent from the calling party is given in order to provide the called party the location information at the more detailed level. The determination as to whether consent is needed can be accomplished, for example, from the user/subscriber profile of the calling party. For example, the calling party's profile could be such that permission is given to provide any requested level of location information. Or, the calling party's profile could be such that permission is given to provide up to a specific level of location information. Or, the calling party could be queried, via the called party's communications device, to grant or deny permission/consent. For example, a text message could be displayed on the calling party's communications device indicating that the called party would like to know the calling party's location, or the like.

If, at step 58, consent is denied, or not given (e.g., not specifically provided by called party, not part of called party's profile), the called party can be notified, at step 64, that more detailed information cannot be provided, that consent has not been granted, or the like, or a combination thereof. If at step 58, consent is granted, more detailed location information is obtained at step 60. More detailed location information can be obtained via any appropriate mechanism. For example, more detailed location information can be obtained, as described in more detail below, via a default location from a call originating from a landline, the Global Positioning System (GPS), assisted GPS (A-GPS), time difference of arrival calculations, configured constant location (in the case of non-moving devices), or any appropriate combination thereof. And, the more detailed location information is provided to the called party at step 62.

Figure 5:
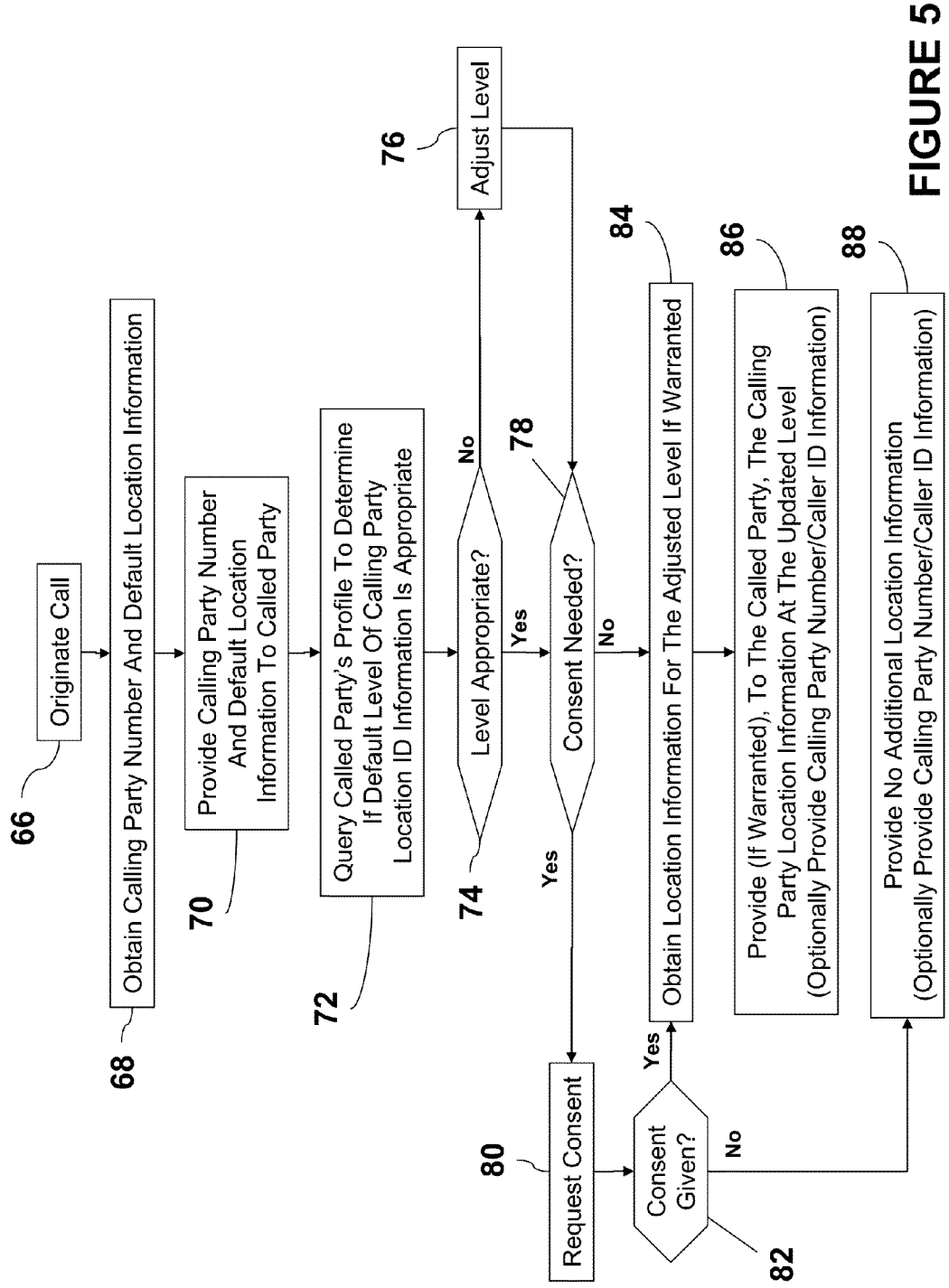
FIG. 5 is a flow diagram of another example process for providing location information to a called party.

FIG. 5 is a flow diagram of an example process for providing location information to a called party. The process depicted in FIG. 5 is described with example implementation via the system depicted in FIG. 1. It is to be understood however, that implementation of the process depicted in FIG. 5 is not to be limited to the system depicted in FIG. 1, but rather, could be implemented via any appropriate system or systems.

The call is originated at step 66. The call could be originated from example landline communications device 12 or 14 as depicted in FIG. 1. The call could be originated from example mobile communications device 16 or 18 as depicted in FIG. 1. Upon initiation of the call, default location information and the calling party phone number are obtained at step 68. Default location information and the calling party phone number can be obtained via an SSP (e.g., SSP 96 and/or SSP 98) as depicted in FIG. 1. In an example embodiment, the default level of location information is a course geographic resolution (least fine resolution) such as, for example, the default level depicted in FIG. 2. In example embodiment, if no calling party location information is available, the area code and/or exchange number can be translated to a state and/or locality, or the like, and the state/locality can be used as default location information.

The calling party number and default location information are provided to the called party at step 70. If the default location information was translated from an area code and/or exchange (e.g., the default location information represents the state and locality of the area code and/or exchange), in an example embodiment, the default location information can be provided to the called party with a statement, warning, or the like, indicating that the location information may not be accurate, or an equivalent message (e.g., because it was derived from the phone number). This message/warning could be provided visually, acoustically, mechanically, or any appropriate combination thereof.

The called party can be, for example, a user of mobile communications device 16 or 18, or landline communications device 12 or 14, as depicted in FIG. 1. The called party's profile is queried at step 72. The called party's profile can be queried to determine if default location information is appropriate. And the determination as to whether the default location information is appropriate can be accomplished at step 74.

In an example embodiment, to determine if the default level of location information is appropriate, a selected level of location information is compared to the default location information to determine if the default location information falls within the selected level of location information. The selected level of location information can be a subscribed-for level (e.g., by the called party or by the calling party), a level selected on a per call basis, a level selected on demand (e.g., requested by the called party upon an indication of an incoming call), or the like. For example, referring to FIG. 2, a called party may subscribe for location information to be provided at level 2 or higher. If the default level of location information is level 3, then the default level of location information is appropriate and may be provided to the called party. Or, if the default level of location information is level 1, then the default level of location information is not appropriate and location information at the subscribed/requested level may be obtained and provided to the called party. As another example, the called party may see a default level of location information along with the caller ID information of the calling party and the called party may select, on demand, a higher level of location information. As yet another example, a called party could subscribe for a specific level of location information for specific phone numbers. For example, a called party's profile could indicate that the called party wants the highest level available when the calling party is one of her children. And, the called party's profile could indicate that the called party wants the default level when the calling party is her place of employment.

Thus, the geographic resolution of the default level is compared to the geographic resolution of the selected level. If the geographic resolution of the default level is as fine, or finer (e.g., at the level or at a higher level as depicted in FIG. 2), than the geographic resolution of the selected level, the default level is appropriate. If the geographic resolution of the default level is less fine (e.g., at a lower level as depicted in FIG. 2) than the geographic resolution of the selected level, the default level is not appropriate, but rather, the selected level is appropriate. The comparison can be accomplished, for example, by comparing the default location information with the selected level of location information stored in the living unit address database 26 as depicted in FIG. 1.

In an example configuration, the determination as to whether the default level of location information is appropriate can be accomplished by the address/location handler 28. If the default location information falls within the selected level of location information, the default level of location information is appropriate. If the default location information does not fall within the selected level of location information, the default level of location information is not appropriate. For example, if the default level of location information is a state and the selected level of location information is the most accurate/precise level of location information available (e.g., level 5 as depicted in FIG. 2), the default level is not appropriate. Or, if the default level of location information is a state and the selected level of location information is a country, the default level is appropriate.

If, at step 74, it is determined that the default location information does not fall within the selected level of location information (the default level is not appropriate), the level of location information is adjusted at step 76. In an example embodiment the level of location information is adjusted to the selected level of location information. At step 78, it is determined if consent is needed from the calling party in order to provide the called party the location information of the calling party at the adjusted (e.g., selected) level.

If, at step 72, it is determined that the default location information does fall within the selected level of location information (the default level is appropriate), at step 76, it is determined if consent is needed from the calling party in order to provide the called party the location information of the calling party at the default level.

The determination as to whether consent is needed can be accomplished, for example, from the user/subscriber profile of the calling party. Or, if no information is available about whether consent is needed from the calling party, in an example configuration, the default can be to request consent from the calling party.

In an example embodiment, if the calling party is using a landline communications device (e.g., communications device 12 or 14 as depicted in FIG. 1), the calling party's profile information can be stored in an SSP, and the address/location handler 28 can query an appropriate SSP (e.g., SSP 96 or 98) in order to determine if the calling party requires consent. The calling party's profile information can be stored in any appropriate location, such as, for example, and SSP, a profile database associated with the location coordinates and mapping database, the address/location handler, or any appropriate network entity. In an example configuration, the calling party's profile could be stored in the living unit address database 26 depicted in FIG. 1. The calling party's profile could be such that permission is given to provide any requested level of location information. Or, the calling party's profile could be such that permission is given to provide up to a specific level of location information. And, if the calling party's profile provides no indication as to whether permission is needed, a default position can be to ask for consent from the calling party.

In an example embodiment, if the calling party is using a mobile wireless communications device, such as a cellular communications device (e.g., communications device 16 or 18 as depicted in FIG. 1), the calling party's profile information can be stored in an HLR and/or VLR, and the address/ location handler 28 can query an appropriate HLR (e.g., HLR 90) and/or VLR (e.g., VLR 92) in order to determine if the calling party requires consent. In an example configuration, the calling party's profile could be stored in the living unit address database 26 depicted in FIG. 1. The calling party's profile could be such that permission is given to provide any requested level of location information. Or, the calling party's profile could be such that permission is given to provide up to a specific level of location information. And, if the calling party's profile provides no indication as to whether permission is needed, a default position can be to ask for consent from the calling party.

If no consent is needed (step 78), location information at the updated level (e.g., subscribed-for level, default level, etc.), if warranted, is obtained at step 84. That is, if the level of the location information was updated (at step 76), then, location information of the calling party is obtained for the updated level. If the level was not updated, then additional location information is not obtained, because the previously provided (at step 70) default location information will suffice. Location information (e.g., updated and/or default) can be obtained via any appropriate mechanism. In an example embodiment, if the call is originating from a landline communications device, the location information can be obtained via a default location (e.g., via an SSP, such as SSP 96 or 98 as depicted in FIG. 1) utilizing the address/location handler 28, the living unit address database 26 and/or the location coordinates and mapping database 30 as described herein. In another example embodiment, the calling party could be requested to provide his or her current location. For example, a message could be provided to the calling party (such as a voice or text message provided via the intelligent peripheral, IP 94, depicted in FIG. 1), indicating that the called party subscribes to a caller location ID service and requests the calling party to enter a current location.

In an example embodiment, if the call is originating from a wireless mobile communications device, such as a cellular communications device, the location information can be obtained via a default location (e.g., geographical location described above), the living unit address database 26, and/or the location coordinates and mapping database 30 (depicted in FIG. 1). For example, the level of location information previously determined by providing the geographical location of the calling party (obtained at step 104) to the location coordinates and mapping database 30 (depicted in FIG. 1) and the geographical location of the calling party can be provided to the location coordinates and mapping database 30 to obtain the location information at the appropriate level.

In another example configuration, the living unit address database 26 depicted in FIG. 1 could be queried to obtain the location information of the calling party. For example, the phone number of the calling party could be provided to the living unit address database 26. The phone number could be used to determine an address of the originating call (e.g., via a look up table, directory, etc.) and the address could be provided as the appropriate location information. And, if this location information is provided to the calling party, in an example embodiment, it will provided with a statement/warning that the location information may not be accurate, as previously described.

At step 86, if warranted, location information, at the adjusted level, is provided to the called party. Thus, if the level of the location information was updated (at step 76), then, the updated level of location information of the calling party that was obtained at step 84 is provided to the called party. If the level was not updated, then no additional location information is provided, because the previously provided (at step 70) default location information is sufficient. Optionally, at step 86, the number of the calling party, name (e.g., caller ID information) can be provided to the called party. An indication of the location information, name, and/or the number of the calling party can be rendered on the communications device of the called party visually (e.g., graphics, text, map indicating location of calling party), via audio (e.g., via an audio message), or mechanically (e.g., via vibrations such as Morse code, etc.).

If, at step 78, if it is determined that consent is needed, consent is requested at step 80. If consent is given at step 82, the process proceeds to step 84 and step 86 as described above.

If, at step 82, consent is not given, no additional location information is provided at step 88, and the default information provided to the called party (at step 70) is maintained. Optionally, at step 88, the number of the calling party and/or the name (e.g., caller ID information) could be provided to the called party. In an example embodiment, the called party could be provided a message indicating that the calling party has denied permission to allow his or her location to be provided. This message could be rendered (visual, audio, mechanical, etc.) on the communications device of the calling party.

Figure 6:
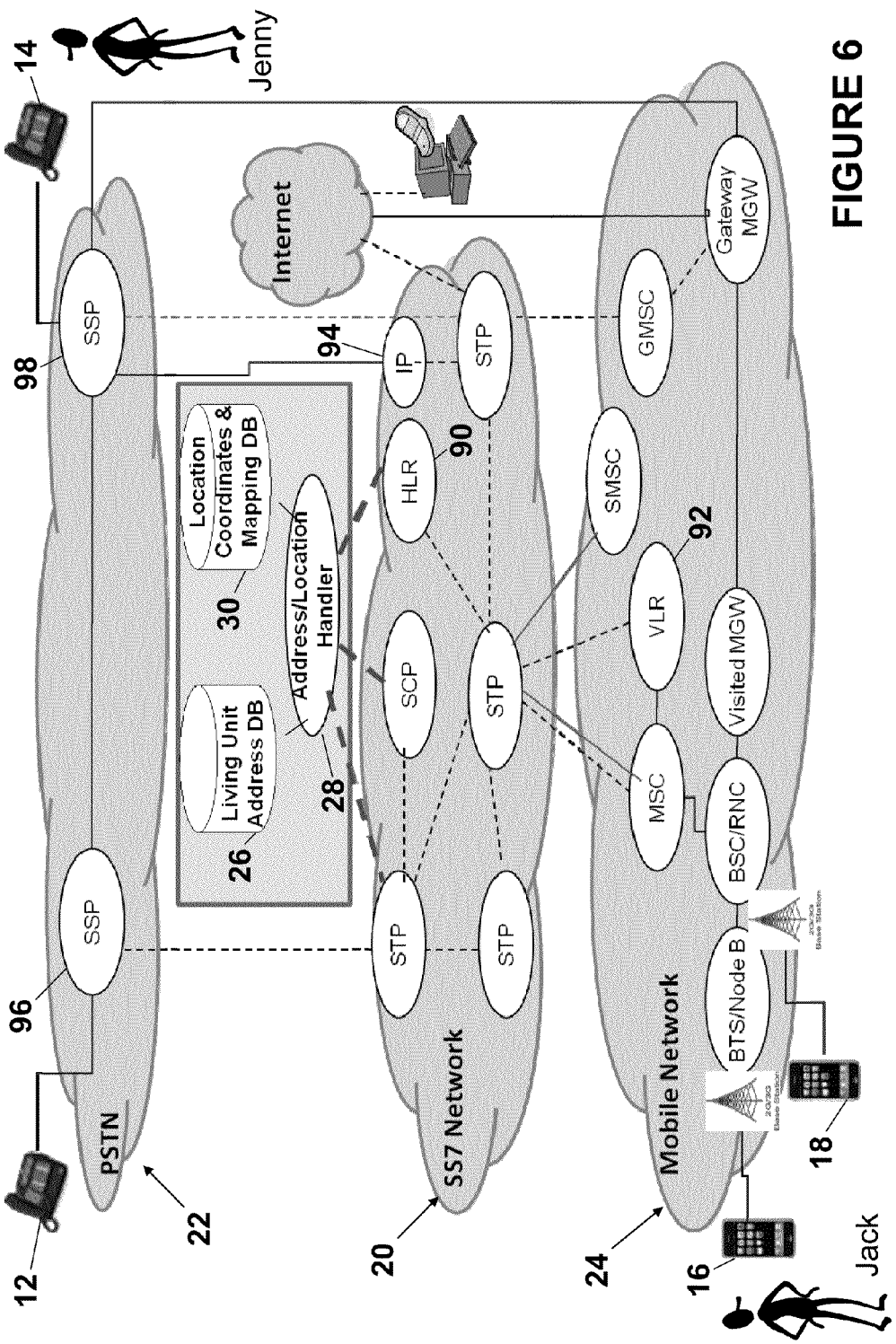
FIG. 6 is an illustration of an example system and method depicting a scenario in which location information is utilized to avoid a confrontation.

FIG. 6 is an illustration of an example system and method depicting a scenario in which location information is utilized to avoid a confrontation. In accordance with the example scenario, Jenny, shown in the upper right corner of FIG. 6, and Jack, shown in the lower left corner of FIG. 6, have had a relationship for several years. Jenny subscribes to a default location information option. Thus, Jenny's subscriber profile, as stored in an appropriate SSP, such as SSP 98, or any appropriate network entity (e.g., line information database, LIDB, intelligent peripheral, IP, etc.), indicates that she will accept the default location information of a caller. Jenny lives in the bay area of northern California and Jack lives in southern California. In recent months, the relationship between Jack and Jenny has worsened to the point that Jenny does not want to be near Jack. Thus, a few months ago, Jenny upgraded her location information subscription to the premium level subscription, which corresponds to a minimum of level 3 as depicted in FIG. 2. Accordingly, Jenny's subscriber profile, as stored in an appropriate SSP, such as SSP 98, or any appropriate network entity (e.g., line information database, LIDB, intelligent peripheral, IP, etc.), has been updated to indicate that she wants level 3 location information of a caller. Thus, if Jack calls Jenny, Jenny will know Jack's location before deciding to answer Jack's call.

One day, Jack is driving to Jenny's town with the intention to confront her. When Jack is about 10 miles away (in a town named Gilroy) from Jenny's house, he calls Jenny (Jenny's home landline phone 14), from his mobile communication device 16, to make sure Jenny is home. Upon making the call, Jack's default location information and caller ID information is sent to Jenny's terminating switch. Jack's default location is the location associated with the cellular site handling Jack's call via VLR 92. The default location information reaches Jenny's terminating switch, SSP 98, via appropriate entities depicted in FIG. 6. A subscriber profile look up in SSP 98 indicates that Jenny has subscribed to level 3 location information. Level 3 is a more detailed level of location than provided in Jack's default location. Thus, the SSP 98 initiates a signal back to Jack's mobile communications device 16. The signal is provided to Jack's mobile communications device via any appropriate entities depicted in FIG. 6. Jack receives a message on his mobile communications device 16 requesting his permission to provide the called party (Jenny)

his location. Jack agrees by selecting consent via the user interface on his mobile communications device 16, and the indication of the consent is provided to Jenny's terminating switch, SSP 98. Upon receipt of the indication of consent, the SSP 98 initiates a look up transaction. More specifically, the SSP 98 sends to the address/location handler 28, a look up request (query) for location information. The query includes Jack's caller ID information (name and number) and a level indicator (level 3). The address/location handler 28 forwards the query to the living unit address database 26 and the location coordinates and mapping database 30. In response to the query, the address/location handler provides to the SSP 98 the level 3 location information. Accordingly, Jenny sees displayed on her landline phone 14, Jack's name, his number, and an indication of the town in which Jack is located (e.g., "Gilroy"). Jenny, upon viewing this location information, chooses not to answer the call, and not wanting to confront Jack, Jenny drives away from her home, suspecting that Jack is on his way.

In an example embodiment, if a restraining order, or the like, has been put into place, this could be included in Jenny's subscriber profile. Accordingly, when Jack's location information reaches Jenny's terminating switch, the terminating switch could initiate a call to appropriate authorities, indicating that the order is about to be, or has been, violated. Further, Jack's phone number and location, also or alternatively, could be provided to the authorities.

Figure 7:
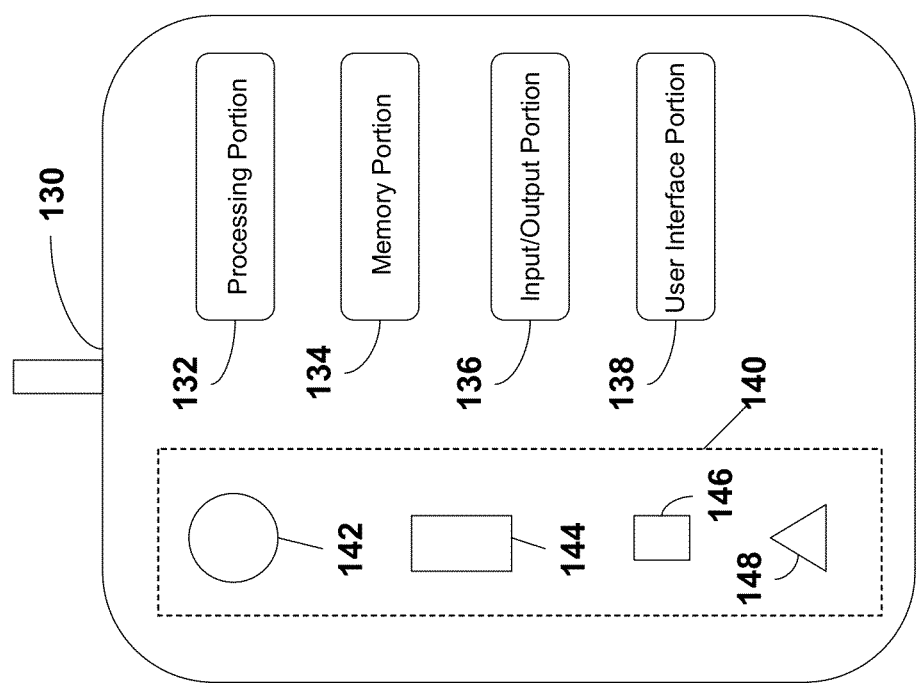
FIG. 7 is a block diagram of an example communications device that is configurable to facilitate provisioning of location information.

FIG. 7 is a block diagram of an example communications device 130 that is configurable to facilitate provisioning of location information. The communications device 130 can include any appropriate device, mechanism, software, and/or hardware for facilitating provisioning of location information as described herein. As described herein, the communications device 130 comprises hardware, or a combination of hardware and software. Each portion of the communications device 130 comprises hardware, or a combination of hardware and software. In an example configuration, the communications device 130 can comprise a processing portion 132, a memory portion 134, an input/output portion 136, a user interface (UI) portion 138, and a sensor portion 140 comprising at least one of a video camera portion 142, a force/wave sensor 144, a microphone 146, a moisture sensor 148, or a combination thereof. The force/wave sensor 144 comprises at least one of a motion detector, an accelerometer, an acoustic sensor, a tilt sensor, a pressure sensor, a temperature sensor, or the like. The motion detector is configured to detect motion occurring outside of the communications device, for example via disturbance of a standing wave, via electromagnetic and/or acoustic energy, or the like. The accelerometer is capable of sensing acceleration, motion, and/or movement of the communications device. The acoustic sensor is capable of sensing acoustic energy, such as a noise, voice, etc., for example. The tilt sensor is capable of detecting a tilt of the communications device. The pressure sensor is capable of sensing pressure against the communications device, such as from a shock wave caused by broken glass or the like. The temperature sensor is capable of sensing a measuring temperature, such as inside of the vehicle, room, building, or the like. The moisture sensor 148 is capable of detecting moisture, such as detecting if the communications device 130 is submerged in a liquid. The processing portion 132, memory portion 134, input/output portion 136, user interface (UI) portion 138, video camera portion 142, force/wave sensor 144, and microphone 146 are coupled together to allow communications therebetween (coupling not shown in FIG. 7). The communications device 130 also can comprise a timer (not depicted in FIG. 7).

In various embodiments, the input/output portion 136 comprises a receiver of the communications device 130, a transmitter of the communications device 130, or a combination thereof. The input/output portion 136 is capable of receiving and/or providing information pertaining to provisioning of location information as described herein. The input/output portion 136 also is capable of communications with other communications devices as described herein. For example, the input/output portion 136 can include a wireless communications (e.g., 2.5G/3G/4G) SIM card. In an example embodiment, the input/output portion 136 is capable of receiving and/or sending information to determine a location of the communications device 130. In an example configuration, the input\output portion 136 comprises a GPS receiver. In an example configuration, the communications device 130 can determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 136 can receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion comprises a WIFI finder, a two way GPS chipset or equivalent, or the like.

The processing portion 132 is capable of facilitating provisioning of location information as described herein. The processing portion 132, in conjunction with any other portion of the communications device 130 as needed, can provide the ability for users/subscribers to enable, disable, and configure various features of an application to facilitate provisioning of location information, as described herein. The processing portion 132, in conjunction with any other portion of the communications device 130, can enable the communications device 130 to covert speech to text or convert text to speech.

In a basic configuration, the communications device 130 can include at least one memory portion 134. The memory portion 134 can store any information utilized in conjunction with facilitating provisioning of location information as described herein. Depending upon the exact configuration and type of processor, the memory portion 134 can be volatile (such as some types of RAM), non-volatile (such as ROM, flash memory, etc.). The communications device 130 can include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory portion 134, or a portion of the memory portion 134 is hardened such that information stored therein can be recovered if the communications device 130 is exposed to extreme heat, extreme vibration, extreme moisture, corrosive chemicals or gas, or the like. In an example configuration, the information stored in the hardened portion of the memory portion 134 is encrypted, or otherwise rendered unintelligible without use of an appropriate cryptographic key, password, biometric (voiceprint, fingerprint, retinal image, facial image, or the like). Wherein, use of the appropriate cryptographic key, password, biometric will render the information stored in the hardened portion of the memory portion 134 intelligible.

The communications device 130 also can contain a UI portion 138 allowing a user to communicate with the communications device 130. The UI portion 138 is capable of rendering any information utilized in conjunction facilitating provisioning of location information as described herein. For example, the UI portion 138 can provide means for entering characters (e.g., text, numbers, symbols, etc.), entering a phone number, rendering characters, rendering text, rendering images, rendering multimedia, rendering sound, rendering video, receiving sound, or the like, as described herein. The UI portion 138 can provide the ability to control the communications device 130, via, for example, buttons, soft keys, voice actuated controls, a touch screen, movement of the mobile communications device 130, visual cues (e.g., moving a hand in front of a camera on the mobile communications device 130), or the like. The UI portion 138 can provide visual information (e.g., via a display), audio information (e.g., via speaker), mechanically (e.g., via a vibrating mechanism), or a combination thereof. In various configurations, the UI portion 138 can comprise a display, a touch screen, a keyboard, a speaker, or any combination thereof. The UI portion 138 can comprise means for inputting biometric information, such as, for example, fingerprint information, retinal information, voice information, and/or facial characteristic information. The UI portion 138 can be utilized to enter an indication of the designated destination (e.g., the phone number, IP address, or the like).

In an example embodiment, the sensor portion 140 of the communications device 130 comprises the video camera portion 142, the force/wave sensor 144, and the microphone 146. The video camera portion 142 comprises a camera (or cameras) and associated equipment capable of capturing still images and/or video and to provide the captured still images and/or video to other portions of the communications device 130. In an example embodiment, the force/wave sensor 144 comprises an accelerometer, a tilt sensor, an acoustic sensor capable of sensing acoustic energy, an optical sensor (e.g., infrared), or any combination thereof.

Figure 8:
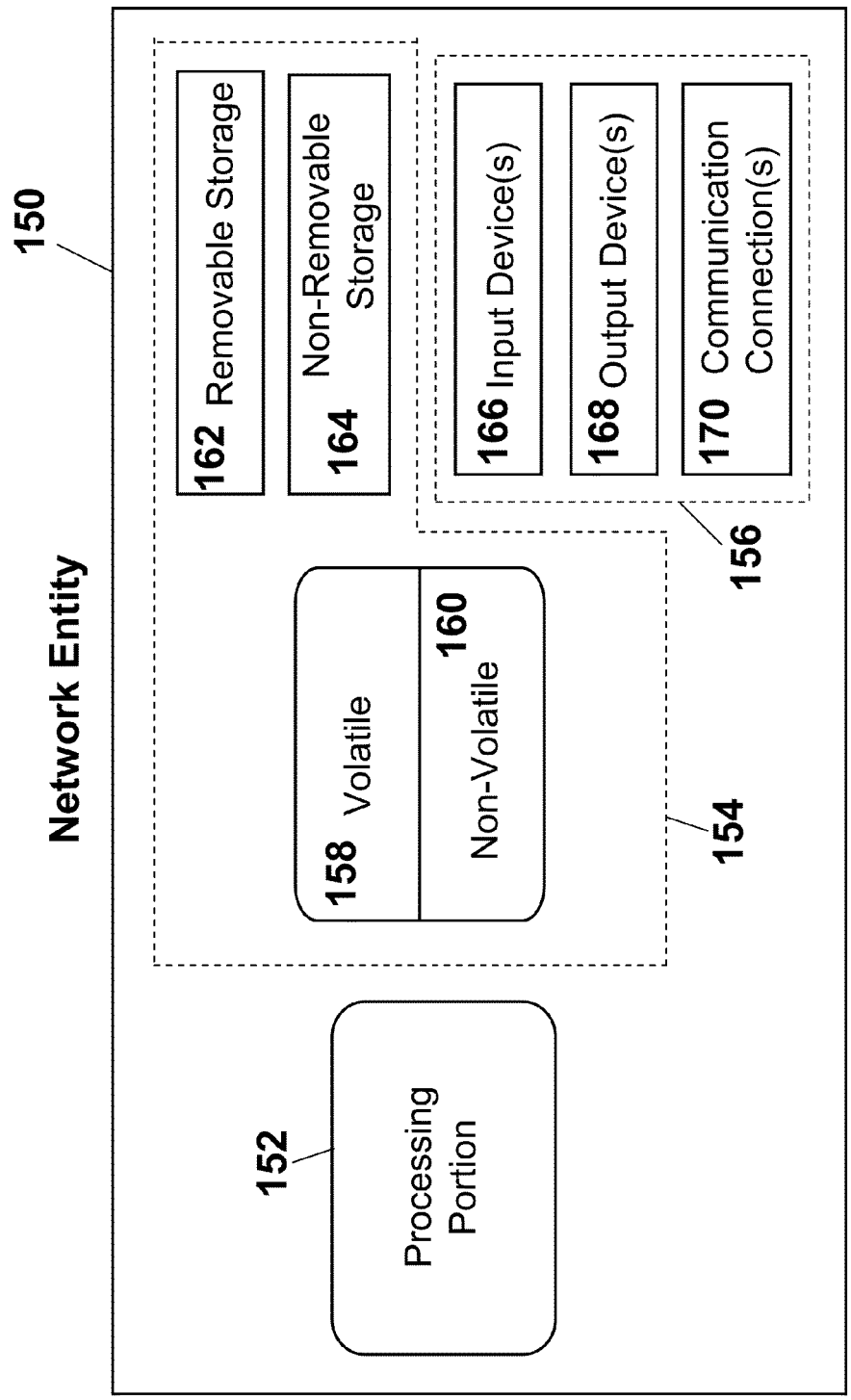
FIG. 8 is a block diagram of an example network entity configurable to facilitate provisioning of location information.

FIG. 8 is a block diagram of an example network entity 150 configurable to facilitate provisioning of location information as described herein. In an example embodiment, the network entity 150 comprises hardware, or a combination of hardware and software. And, each portion of the network entity 150 comprises hardware, or a combination of hardware and software. When used in conjunction with a network, the functionality needed to facilitate provisioning of location information can reside in any one or combination of network entities. The network entity 150 depicted in FIG. 8 represents any appropriate network entity, apparatus, or combination of network entities or apparatuses, such as a processor, a server, a gateway, etc., or any combination thereof. The network entity 150 can represent any individual or combination of entities depicted in FIG. 1. For example, the network entity 150 can represent an SSP, an STP, and SCP, an HLR, an IP, an MSC, a VLR, an SMSC, a GMSC, a gateway MGW, a visited MGW, a SSC, a RNC, a BTS, a NodeB, a living unit address database, a location coordinates and mapping database, an address/location handler, or any appropriate combination thereof. It is emphasized that the block diagram depicted in FIG. 8 is exemplary and not intended to imply a specific implementation or configuration. Thus, the network entity 150 can be implemented in a single processor or multiple processors (e.g., single server or multiple servers, single gateway or multiple gateways, etc.). Multiple network entities can be distributed or centrally located. Multiple network entities can communicate wirelessly, via hard wire, or a combination thereof.

In an example configuration, the network entity 150 comprises a processing portion 152, a memory portion 154, and an input/output portion 156. The processing portion 152, memory portion 154, and input/output portion 156 are coupled together (coupling not shown in FIG. 8) to allow communications therebetween. The input/output portion 156 is capable of receiving and/or providing information from/to a device (e.g., communications device 130, 12, 14, 16, 18) and/or other network entity configured to be utilized when distributing connectivity and/or transmission time.

The processing portion 152 is capable of performing functions associated with facilitating provisioning of location information, as described herein. For example, the processing portion 152 is capable of, in conjunction with any other portion of the network entity 150 as needed, executing an application, or applications, for facilitating provisioning of location information. The memory portion 154 can store any information utilized in conjunction with facilitating provisioning of location information, as described herein. Depending upon the exact configuration and type of network entity 150, the memory portion 154 can include a computer storage medium, or media, that is volatile 158 (such as dynamic RAM), non-volatile 160 (such as ROM), or a combination thereof. The network entity 150 can include additional storage, in the form of computer storage media (e.g., removable storage 162 and/or non-removable storage 164) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium, also referred to as a computer-readable storage medium, is an article of manufacture, having a concrete physical structure.

The network entity 150 also can contain communications connection(s) 170 that allow the network entity 150 to communicate with other devices, network entities, or the like. A communications connection(s) can comprise communication media. Communication media can be used to communicate computer readable instructions, data structures, program modules, or other data. Communication media can include an appropriate transport mechanism or information delivery media that can be used to transport a modulated data signal such as a carrier wave.

The network entity 150 also can include input device(s) 166 such as keyboard, mouse, pen, voice input device, touch input device, an optical input device, etc. Output device(s) 168 such as a display, speakers, printer, mechanical vibrators, etc. also can be included.

The communications device (e.g., communications device 130, 12, 14, 16, 18) and the network entity (network entity 150) can be part of and/or in communication with various wireless communications networks. Some of which are described below.

Figure 9:
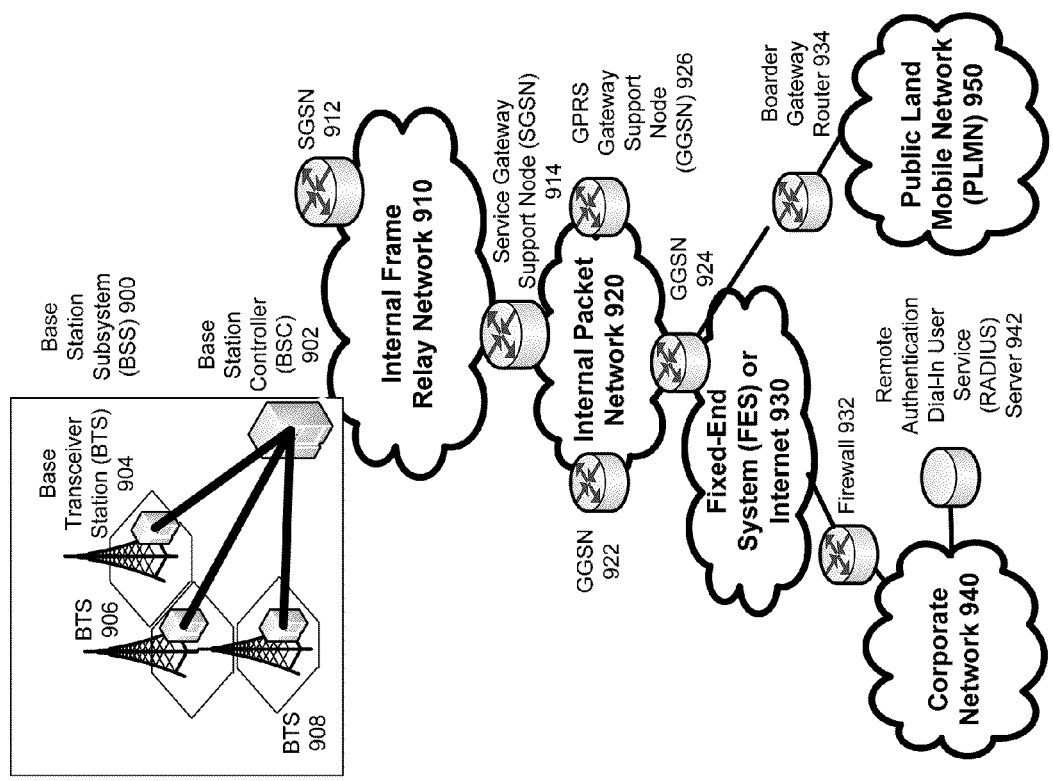
FIG. 9 depicts an overall block diagram of an exemplary packet-based mobile cellular network environment, such as a GPRS network, in which provisioning of location information can be implemented.

FIG. 9 depicts an overall block diagram of an exemplary packet-based mobile cellular network environment, such as a GPRS network, in which provisioning of location information can be implemented. In the exemplary packet-based mobile cellular network environment shown in FIG. 9, there are a plurality of Base Station Subsystems ("BSS") 900 (only one is shown), each of which comprises a Base Station Controller ("BSC") 902 serving a plurality of Base Transceiver Stations ("BTS") such as BTSs 904, 906, and 908. BTSs 904, 906, 908, etc. are the access points where users of packet-based mobile devices become connected to the wireless network. In exemplary fashion, the packet traffic originating from user devices is transported via an over-the-air interface to a BTS 908, and from the BTS 908 to the BSC 902. Base station subsystems, such as BSS 900, are a part of internal frame relay network 910 that can include Service GPRS Support Nodes ("SGSN") such as SGSN 912 and 914. Each SGSN is connected to an internal packet network 920 through which a SGSN 912, 914, etc. can route data packets to and from a plurality of gateway GPRS support nodes (GGSN) 922, 924, 926, etc. As illustrated, SGSN 914 and GGSNs 922, 924, and 926 are part of internal packet network 920. Gateway GPRS serving nodes 922, 924 and 926 mainly provide an interface to external Internet Protocol ("IP") networks such as Public Land Mobile Network ("PLMN") 950, corporate intranets 940, or Fixed-End System ("FES") or the public Internet 930. As illustrated, subscriber corporate network 940 may be connected to GGSN 924 via firewall 932; and PLMN 950 is connected to GGSN 924 via boarder gateway router 934. The Remote Authentication Dial-In User Service ("RADIUS") server 942 may be used for caller authentication when a user of a mobile cellular device calls corporate network 940.

Generally, there can be several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 10:
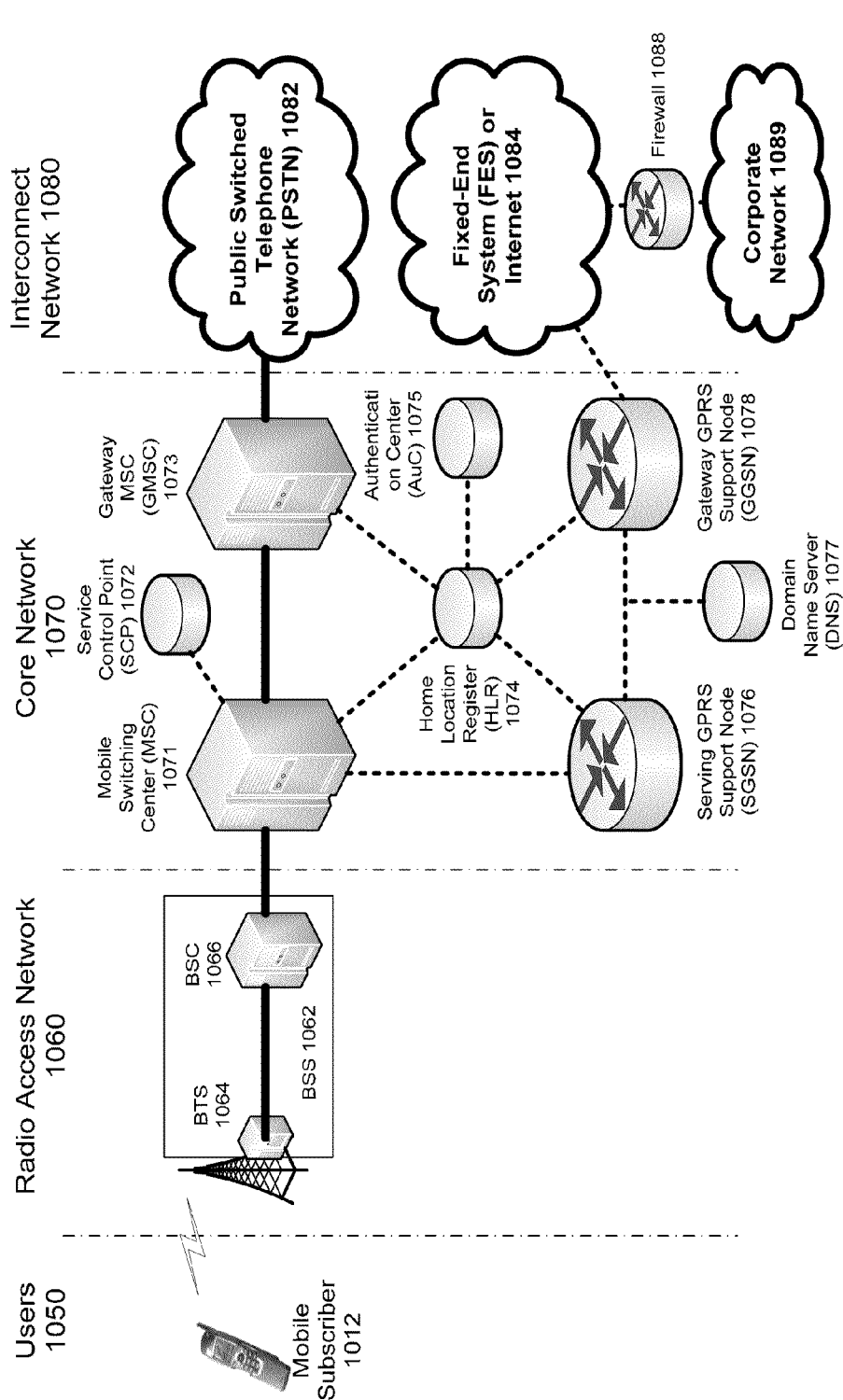
FIG. 10 illustrates an architecture of a typical GPRS network in which provisioning of location information can be implemented.

FIG. 10 illustrates an architecture of a typical GPRS network in which provisioning of location information can be implemented. The architecture depicted in FIG. 10 is segmented into four groups: users 1050, radio access network 1060, core network 1070, and interconnect network 1080. Users 1050 comprise a plurality of end users. Note, device 1012 is referred to as a mobile subscriber in the description of network shown in FIG. 10. In an example embodiment, the device depicted as mobile subscriber 1012 comprises a communications device (e.g., wireless anti-theft security M2M type device 36). Radio access network 1060 comprises a plurality of base station subsystems such as BSSs 1062, which include BTSs 1064 and BSCs 1066. Core network 1070 comprises a host of various network elements.

As illustrated in FIG. 10, core network 1070 may comprise Mobile Switching Center ("MSC") 1071, Service Control Point ("SCP") 1072, gateway MSC 1073, SGSN 1076, Home Location Register ("HLR") 1074, Authentication Center ("AuC") 1075, Domain Name Server ("DNS") 1077, and GGSN 1078. Interconnect network 1080 also comprises a host of various networks and other network elements. As illustrated in FIG. 10, interconnect network 1080 comprises Public Switched Telephone Network ("PSTN") 1082, Fixed-End System ("FES") or Internet 1084, firewall 1088, and Corporate Network 1089.

A mobile switching center can be connected to a large number of base station controllers. At MSC 1071, for instance, depending on the type of traffic, the traffic may be separated in that voice may be sent to Public Switched Telephone Network ("PSTN") 1082 through Gateway MSC ("GMSC") 1073, and/or data may be sent to SGSN 1076, which then sends the data traffic to GGSN 1078 for further forwarding.

When MSC 1071 receives call traffic, for example, from BSC 1066, it sends a query to a database hosted by SCP 1072. The SCP 1072 processes the request and issues a response to MSC 1071 so that it may continue call processing as appropriate.

The HLR 1074 is a centralized database for users to register to the GPRS network. HLR 1074 stores static information about the subscribers such as the International Mobile Subscriber Identity ("IMSI"), subscribed services, and a key for authenticating the subscriber. HLR 1074 also stores dynamic subscriber information such as the current location of the mobile subscriber. Associated with HLR 1074 is AuC 1075. AuC 1075 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when mobile subscriber 1012 initiates the attach process by turning on the network capabilities of the mobile device, an attach request is sent by mobile subscriber 1012 to SGSN 1076. The SGSN 1076 queries another SGSN, to which mobile subscriber 1012 was attached before, for the identity of mobile subscriber 1012. Upon receiving the identity of mobile subscriber 1012 from the other SGSN, SGSN 1076 requests more information from mobile subscriber 1012. This information is used to authenticate mobile subscriber 1012 to SGSN 1076 by HLR 1074. Once verified, SGSN 1076 sends a location update to HLR 1074 indicating the change of location to a new SGSN, in this case SGSN 1076. HLR 1074 notifies the old SGSN, to which mobile subscriber 1012 was attached before, to cancel the location process for mobile subscriber 1012. HLR 1074 then notifies SGSN 1076 that the location update has been performed. At this time, SGSN 1076 sends an Attach Accept message to mobile subscriber 1012, which in turn sends an Attach Complete message to SGSN 1076.

After attaching itself with the network, mobile subscriber 1012 then goes through the authentication process. In the authentication process, SGSN 1076 sends the authentication information to HLR 1074, which sends information back to SGSN 1076 based on the user profile that was part of the user's initial setup. The SGSN 1076 then sends a request for authentication and ciphering to mobile subscriber 1012. The mobile subscriber 1012 uses an algorithm to send the user identification (ID) and password to SGSN 1076. The SGSN 1076 uses the same algorithm and compares the result. If a match occurs, SGSN 1076 authenticates mobile subscriber 1012.

Next, the mobile subscriber 1012 establishes a user session with the destination network, corporate network 1089, by going through a Packet Data Protocol ("PDP") activation process. Briefly, in the process, mobile subscriber 1012 requests access to the Access Point Name ("APN"), for example, UPS.com, and SGSN 1076 receives the activation request from mobile subscriber 1012. SGSN 1076 then initiates a Domain Name Service ("DNS") query to learn which GGSN node has access to the UPS.com APN. The DNS query is sent to the DNS server within the core network 1070, such as DNS 1077, which is provisioned to map to one or more GGSN nodes in the core network 1070. Based on the APN, the mapped GGSN 1078 can access the requested corporate network 1089. The SGSN 1076 then sends to GGSN 1078 a Create Packet Data Protocol ("PDP") Context Request message that contains necessary information. The GGSN 1078 sends a Create PDP Context Response message to SGSN 1076, which then sends an Activate PDP Context Accept message to mobile subscriber 1012.

Once activated, data packets of the call made by mobile subscriber 1012 can then go through radio access network 1060, core network 1070, and interconnect network 1080, in a particular fixed-end system or Internet 1084 and firewall 1088, to reach corporate network 1089.

Figure 11:
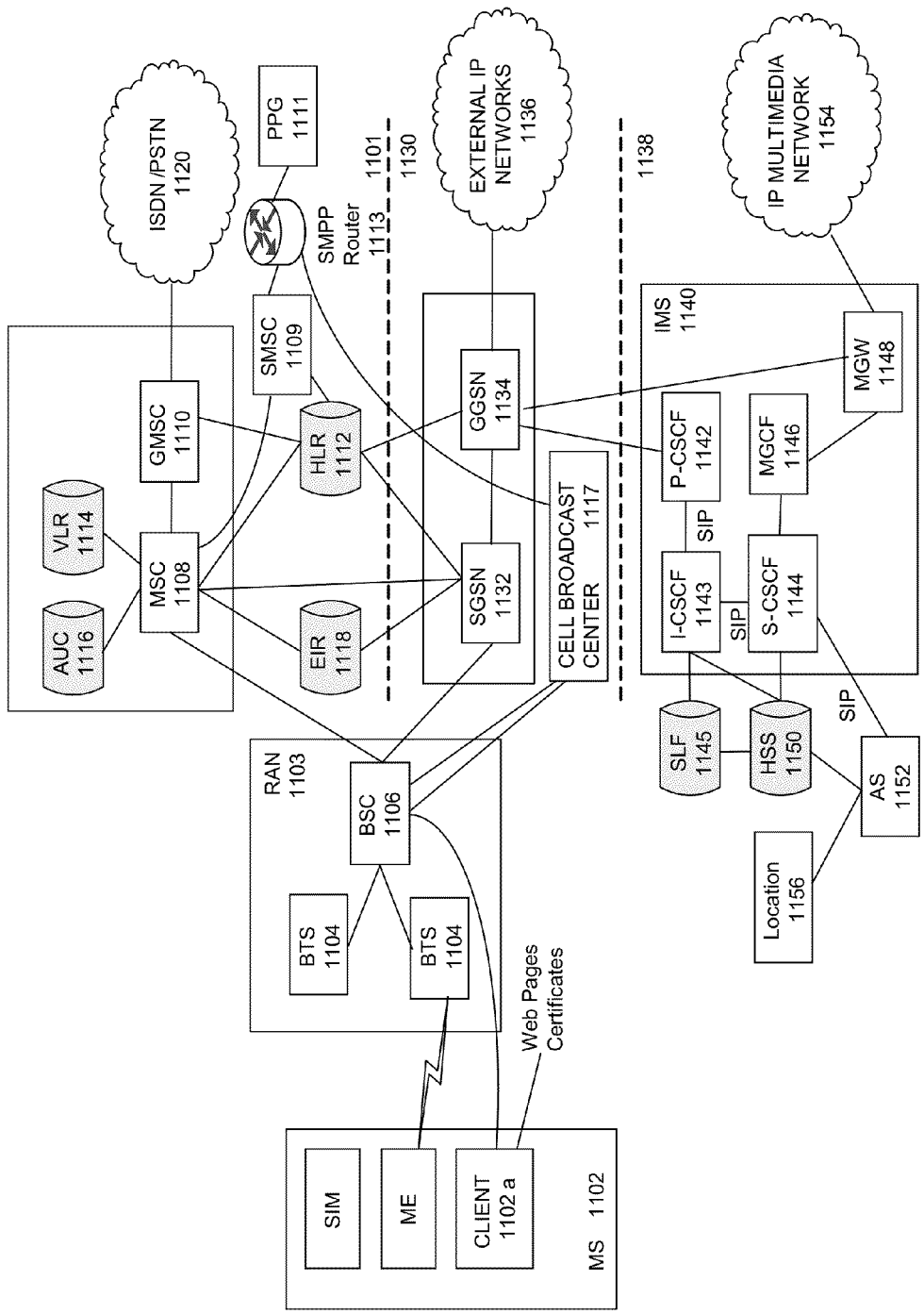
FIG. 11 illustrates an exemplary block diagram view of a GSM/GPRS/IP multimedia network architecture within which provisioning of location information can be implemented.

FIG. 11 illustrates an exemplary block diagram view of a GSM/GPRS/IP multimedia network architecture within which provisioning of location information can be implemented. As illustrated, the architecture of FIG. 11 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1104 is physical equipment, such as a radio tower, that enables a radio interface to communicate with the MS. Each BTS may serve more than one MS. The BSC 1106 manages radio resources, including the BTS. The BSC may be connected to several BTSs. The BSC and BTS components, in combination, are generally referred to as a base station (BSS) or radio access network (RAN) 1103.

The GSM core network 1101 also includes a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1116, and an Equipment Identity Register (EIR) 1118. The MSC 1108 performs a switching function for the network. The MSC also performs other functions, such as registration, authentication, location updating, handovers, and call routing. The GMSC 1110 provides a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that contains administrative information regarding each subscriber registered in a corresponding GSM network. The HLR 1112 also contains the current location of each MS. The VLR 1114 is a database that contains selected administrative information from the HLR 1112. The VLR contains information necessary for call control and provision of subscribed services for each MS currently located in a geographical area controlled by the VLR. The HLR 1112 and the VLR 1114, together with the MSC 1108, provide the call routing and roaming capabilities of GSM. The AuC 1116 provides the parameters needed for authentication and encryption functions. Such parameters allow verification of a subscriber's identity. The EIR 1118 stores security-sensitive information about the mobile equipment.

A Short Message Service Center (SMSC) 1109 allows one-to-one Short Message Service (SMS) messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1102 sends a location update including its current location information to the MSC/VLR, via the BTS 1104 and the BSC 1106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1130 is logically implemented on the GSM core network architecture by introducing two packet-switching network nodes, a serving GPRS support node (SGSN) 1132, a cell broadcast and a Gateway GPRS support node (GGSN) 1134. The SGSN 1132 is at the same hierarchical level as the MSC 1108 in the GSM network. The SGSN controls the connection between the GPRS network and the MS 1102. The SGSN also keeps track of individual MS's locations and security functions and access controls.

A Cell Broadcast Center (CBC) 1117 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1134 provides a gateway between the GPRS network and a public packet network (PDN) or other IP networks 1136. That is, the GGSN provides interworking functionality with external networks, and sets up a logical link to the MS through the SGSN. When packet-switched data leaves the GPRS network, it is transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1138 was introduced with 3GPP Release 11, and includes an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM network 1101, the GPRS network 1130 as well as the IP multimedia network 1138.

The IP multimedia system 1140 is built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 forwards session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143, forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSS's 1150 are present. The S-CSCF 1144 performs the session control services for the MS 1102. This includes routing originating sessions to external networks and routing terminating sessions to visited networks. The S-CSCF 1144 also decides whether an application server (AS) 1152 is required to receive information on an incoming SIP session request to ensure appropriate service handling. This decision is based on information received from the HSS 1150 (or other sources, such as an application server 1152). The AS 1152 also communicates to a location server 1156 (e.g., a Gateway Mobile Location Center (GMLC)) that provides a position (e.g., latitude/longitude coordinates) of the MS 1102.

The HSS 1150 contains a subscriber profile and keeps track of which core network node is currently handling the subscriber. It also supports subscriber authentication and authorization functions (AAA). In networks with more than one HSS 1150, a subscriber location function provides information on the HSS 1150 that contains the profile of a given subscriber.

The MGCF 1146 provides interworking functionality between SIP session control signaling from the IMS 1140 and ISUP/BICC call control signaling from the external GSTN networks (not shown). It also controls the media gateway (MGW) 1148 that provides user-plane interworking functionality (e.g., converting between AMR- and PCM-coded voice). The MGW 1148 also communicates with other IP multimedia networks 1154.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 12:
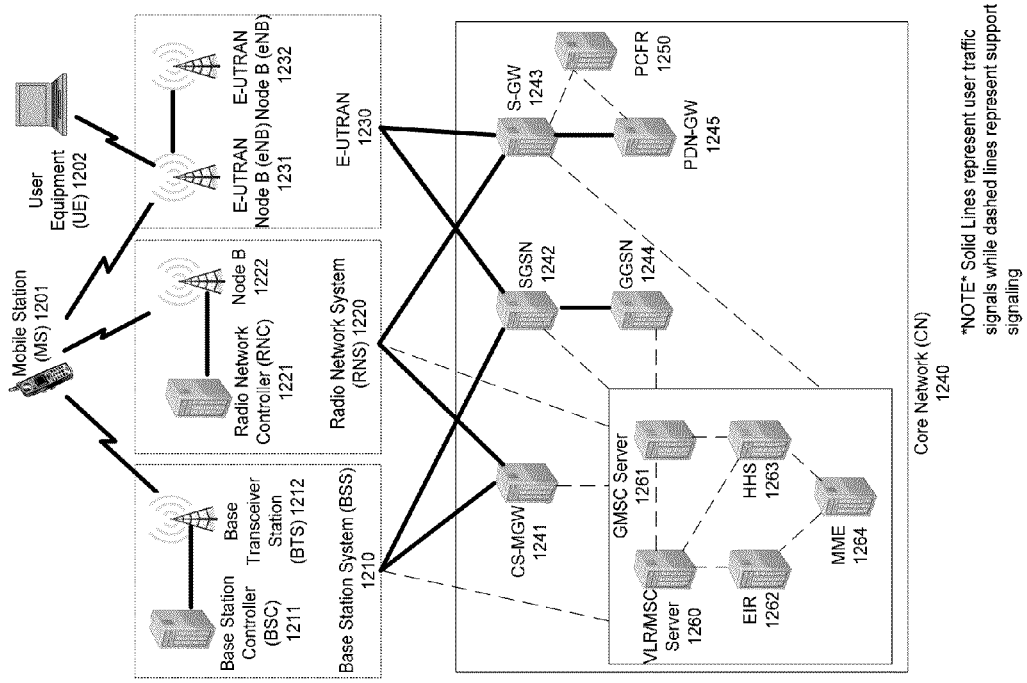
FIG. 12 illustrates a PLMN block diagram view of an exemplary architecture in which provisioning of location information may be incorporated.

FIG. 12 illustrates a PLMN block diagram view of an exemplary architecture in which provisioning of location information may be incorporated. Mobile Station (MS) 1201 is the physical equipment used by the PLMN subscriber. In one illustrative embodiment, any of communications devices 120, 12, 14, 16, or 18 may serve as a Mobile Station 1201. Mobile Station 1201 may be one of, but not limited to, a cellular telephone, a cellular telephone in combination with another electronic device or any other wireless mobile communication device.

Mobile Station 1201 may communicate wirelessly with Base Station System (BSS) 1210. BSS 1210 contains a Base Station Controller (BSC) 1211 and a Base Transceiver Station (BTS) 1212. BSS 1210 may include a single BSC 1211/BTS 1212 pair (Base Station) or a system of BSC/BTS pairs which are part of a larger network. BSS 1210 is responsible for communicating with Mobile Station 1201 and may support one or more cells. BSS 1210 is responsible for handling cellular traffic and signaling between Mobile Station 1201 and Core Network 1240. Typically, BSS 1210 performs functions that include, but are not limited to, digital conversion of speech channels, allocation of channels to mobile devices, paging, and transmission/reception of cellular signals.

Additionally, Mobile Station 1201 may communicate wirelessly with Radio Network System (RNS) 1220. RNS 1220 contains a Radio Network Controller (RNC) 1221 and one or more Node(s) B 1222. RNS 1220 may support one or more cells. RNS 1220 may also include one or more RNC 1221/Node B 1222 pairs or alternatively a single RNC 1221 may manage multiple Nodes B 1222. RNS 1220 is responsible for communicating with Mobile Station 1201 in its geographically defined area. RNC 1221 is responsible for controlling the Node(s) B 1222 that are connected to it and is a control element in a UMTS radio access network. RNC 1221 performs functions such as, but not limited to, load control, packet scheduling, handover control, security functions, as well as controlling Mobile Station 1201's access to the Core Network (CN) 1240.

The evolved UMTS Terrestrial Radio Access Network (E-UTRAN) 1230 is a radio access network that provides wireless data communications for Mobile Station 1201 and User Equipment 1202. E-UTRAN 1230 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1230 may include of series of logical network components such as E-UTRAN Node B (eNB) 1231 and E-UTRAN Node B (eNB) 1232. E-UTRAN 1230 may contain one or more eNBs. User Equipment 1202 may be any user device capable of connecting to E-UTRAN 1230 including, but not limited to, a personal computer, laptop, mobile device, wireless router, or other device capable of wireless connectivity to E-UTRAN 1230. The improved performance of the E-UTRAN 1230 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 12 is the Enhanced Data rates for GSM Evolution (EDGE). EDGE is an enhancement for GPRS networks that implements an improved signal modulation scheme known as 12-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1201 may communicate with any or all of BSS 1210, RNS 1220, or E-UTRAN 1230. In a illustrative system, each of BSS 1210, RNS 1220, and E-UTRAN 1230 may provide Mobile Station 1201 with access to Core Network 1240. The Core Network 1240 may include of a series of devices that route data and communications between end users. Core Network 1240 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1241 is part of Core Network 1240, and interacts with Visitor Location Register (VLR) and Mobile-Services Switching Center (MSC) Server 1260 and Gateway MSC Server 1261 in order to facilitate Core Network 1240 resource control in the CS domain. Functions of CS-MGW 1241 include, but are not limited to, media conversion, bearer control, payload processing and other mobile network processing such as handover or anchoring. CS-MGW 1241 may receive connections to Mobile Station 1201 through BSS 1210, RNS 1220 or both.

Serving GPRS Support Node (SGSN) 1242 stores subscriber data regarding Mobile Station 1201 in order to facilitate network functionality. SGSN 1242 may store subscription information such as, but not limited to, the International Mobile Subscriber Identity (IMSI), temporary identities, or Packet Data Protocol (PDP) addresses. SGSN 1242 may also store location information such as, but not limited to, the Gateway GPRS Support Node (GGSN) 1244 address for each GGSN where an active PDP exists. GGSN 1244 may implement a location register function to store subscriber data it receives from SGSN 1242 such as subscription or location information.

Serving Gateway (S-GW) 1243 is an interface which provides connectivity between E-UTRAN 1230 and Core Network 1240. Functions of S-GW 1243 include, but are not limited to, packet routing, packet forwarding, transport level packet processing, event reporting to Policy and Charging Rules Function (PCRF) 1250, and mobility anchoring for inter-network mobility. PCRF 1250 uses information gathered from S-GW 1243, as well as other sources, to make applicable policy and charging decisions related to data flows, network resources and other network administration functions. Packet Data Network Gateway (PDN-GW) 1245 may provide user-to-services connectivity functionality including, but not limited to, network-wide mobility anchoring, bearer session anchoring and control, and IP address allocation for PS domain connections.

Home Subscriber Server (HSS) 1263 is a database for user information, and stores subscription data regarding Mobile Station 1201 or User Equipment 1202 for handling calls or data sessions. Networks may contain one HSS 1263 or more if additional resources are required. Exemplary data stored by HSS 1263 includes, but is not limited to, user identification, numbering and addressing information, security information, or location information. HSS 1263 may also provide call or session establishment procedures in both the PS and CS domains.

The VLR/MSC Server 1260 provides user location functionality. When Mobile Station 1201 enters a new network location, it begins a registration procedure. A MSC Server for that location transfers the location information to the VLR for the area. A VLR and MSC Server may be located in the same computing environment, as is shown by VLR/MSC Server 1260, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1201 registration or procedures for handover of Mobile Station 1201 to a different section of the Core Network 1240. GMSC Server 1261 may serve as a connection to alternate GMSC Servers for other mobile stations in larger networks.

Equipment Identity Register (EIR) 1262 is a logical element which may store the International Mobile Equipment Identities (IMEI) for Mobile Station 1201. In a typical embodiment, user equipment may be classified as either "white listed" or "black listed" depending on its status in the network. In one embodiment, if Mobile Station 1201 is stolen and put to use by an unauthorized user, it may be registered as "black listed" in EIR 1262, preventing its use on the network. Mobility Management Entity (MME) 1264 is a control node which may track Mobile Station 1201 or User Equipment 1202 if the devices are idle. Additional functionality may include the ability of MME 1264 to contact an idle Mobile Station 1201 or User Equipment 1202 if retransmission of a previous session is required.

While example embodiments of facilitating provisioning of location information have been described in connection with various computing devices/processors, the underlying concepts can be applied to any computing device, processor, or system capable of facilitating provisioning of location information as described herein. The methods and apparatuses for facilitating provisioning of location information, or certain aspects or portions thereof, can take the form of program code (i.e., instructions) embodied in tangible storage media having a concrete physical structure, such as floppy diskettes, CD-ROMs, hard drives, or any other machine-readable storage medium having a concrete physical tangible structure, wherein, when the program code is loaded into and executed by a machine, such as a computer, the machine becomes an apparatus for facilitating provisioning of location information. A computer-readable storage medium, also referred to herein as a computer storage medium, as described herein is an article of manufacture, and thus, not to be construed as a transitory signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for facilitating provisioning of location information can be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating provisioning of location information. When implemented on a general-purpose processor, the program code combines with the processor to provide a unique apparatus that operates to invoke the functionality of facilitating provisioning of location information.

While facilitating provisioning of location information has been described in connection with the various embodiments of the various figures, it is to be understood that other similar embodiments can be used or modifications and additions can be made to the described embodiments for facilitating provisioning of location information. For example, one skilled in the art will recognize that facilitating provisioning of location information as described in the present application may apply to any environment, whether wired or wireless, and may be applied to any number of devices connected via a communications network and interacting across the network. Therefore, facilitating provisioning of location information should not be limited to any single embodiment, but rather should be construed in breadth and scope in accordance with the appended claims.

What is claimed:

1. A method comprising:
   receiving, at a network entity comprising a processor, location information pertaining to a location of a calling party from which a call originated, the location information received at a first level;
   providing, by the network entity, an indication of the location information at the first level, the first level corresponding to a first geographic resolution;
   determining, by the network entity, a second level for providing the location information, the second level corresponding to a second geographic resolution, the second level selected from a plurality of levels based on identification information associated with the call;
   comparing, by the network entity, the first geographic resolution with the second geographic resolution;
   if the first geographic resolution is at least as fine as the second geographic resolution, continuing, by the network entity, to provide the indication of the location information at the first level; and
   if the first geographic resolution is less fine than the second geographic resolution, obtaining, by the network entity, the location information at the second level.

2. The method of claim 1, further comprising:
   requesting consent to provide the location information at the second level; and
   when the consent is granted, providing the indication of the location information at the second level.

3. The method of claim 1, further comprising:
   requesting consent to provide the location information at the second level; and
   when the consent is denied, continuing to provide the indication of the location information at the first level.

4. The method of claim 3, further comprising providing a further indication that the consent has been denied.

5. The method of claim 1, wherein the first level is a default level provided by a system from which the call originated.

6. The method of claim 1, wherein the second level is selected by a party receiving the call.

7. The method of claim 1, wherein the second level is one of the plurality of levels, and wherein the second level is selectable by a party receiving the call.

8. The method of claim 1, wherein continuing to provide the indication of the location information at the first level comprises:
   determining if the indication of the location information at the first level comprises of a geographic region associated with an area code of a phone number of a communications device being used by the calling party to originate the call; and
   if the indication of the location information at the first level comprises the geographic region associated with the area code of the phone number of the communications device being used by the calling party to originate the call, providing a further indication that the indication of the location information at the first level may not be accurate.

9. A network entity comprising:
   a processor; and
   a memory storing instructions that, when executed by the processor, cause the processor to perform operations comprising
      receiving location information pertaining to a location of a calling party from which a call originated, the location information received at a first level,
      providing an indication of the of location information at the first level, the first level corresponding to a first geographic resolution,
      determining a second level for providing the location information, the second level corresponding to a second geographic resolution, the second level selected from a plurality of levels based on identification information associated with the call,
      comparing the first geographic resolution with the second geographic resolution,
      if the first geographic resolution is at least as fine as the second geographic resolution, continuing to provide the indication of the location information at the first level, and
      if the first geographic resolution is less fine than the second geographic resolution, obtaining the location information at the second level.

10. The network entity of claim 9, wherein the operations further comprise:
    requesting consent to provide the location information at the second level; and
    when the consent is granted, providing the location information at the second level.

11. The network entity of claim 9, wherein the operations further comprise:
    requesting consent to provide the location information at the second level; and
    when consent is denied, continuing to provide the location information at the first level.

12. The network entity of claim 9, wherein the first level is a default level provided by a system from which the call originated.

13. The network entity of claim 9, wherein the second level is selected by a party receiving the call.

14. The network entity of claim 9, wherein the second level is one of the plurality of levels, and wherein the second level is selectable by a party receiving the call.

15. The network entity of claim 9, wherein the call is received on a wireline communications device.

16. The network entity of claim 9, wherein continuing to provide the indication of the location information at the first level comprises:
   determining if the indication of the location information at the first level comprises a geographic region associated with an area code of a phone number of a communications device being used by the calling party to originate the call; and
   if the indication of the location information at the first level comprises the geographic region associated with the area code of the phone number of the communications device being used by the calling party to originate the call, providing a further indication that the indication of the location information at the first level may not be accurate.

17. A computer-readable storage medium storing instructions that, when executed by a processor, cause the processor to perform operations comprising:
   receiving location information pertaining to a location of a calling party from which a call originated, the location information received at a first level;
   providing an indication of the location information at the first level, the first level corresponding to a first geographic resolution;
   determining a second level for providing the location information, the second level corresponding to a second geographic resolution, the second level selected from a plurality of levels based on identification information associated with the call;
   comparing the first geographic resolution with the second geographic resolution;
   if the first geographic resolution is at least as fine as the second geographic resolution, continuing to provide the indication of the location information at the first level; and
   if the first geographic resolution is less fine than the second geographic resolution, obtaining the location information at the second level.

18. The computer-readable storage medium of claim 17, wherein the operations further comprise:
   requesting consent to provide the location information at the second level;
   if the consent is granted, providing the location information at the second level; and
   if the consent is denied, continuing to provide the location information at the first level.

19. The computer-readable storage medium of claim 17, wherein continuing to provide the indication of the location information at the first level further comprises:
   determining if the indication of the location information at the first level of comprises a geographic region associated with an area code of a phone number of a communications device being used by the calling party to originate the call; and
   if the indication of the location information at the first level comprises the geographic region associated with the area code of the phone number of the communications device being used by the calling party to originate the call, providing a further indication that the indication of the location information at the first level may not be accurate.

20. The computer-readable storage medium of claim 17, wherein the of location information at the first level is received via a signaling system number 7 network.

* * * * *